(12) United States Patent
Ishida et al.

(10) Patent No.: US 11,882,248 B2
(45) Date of Patent: Jan. 23, 2024

(54) READING DEVICE AND IMAGE FORMING APPARATUS

(71) Applicants: Masahiro Ishida, Kanagawa (JP); Shogo Nakamoto, Kanagawa (JP); Takuya Okamoto, Kanagawa (JP); Hiroki Hamashoji, Kanagawa (JP)

(72) Inventors: Masahiro Ishida, Kanagawa (JP); Shogo Nakamoto, Kanagawa (JP); Takuya Okamoto, Kanagawa (JP); Hiroki Hamashoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/957,475

(22) Filed: Sep. 30, 2022

(65) Prior Publication Data

US 2023/0121999 A1    Apr. 20, 2023

(30) Foreign Application Priority Data

Oct. 18, 2021    (JP) ................. 2021-170443

(51) Int. Cl.
*H04N 1/00* (2006.01)
*H04N 1/10* (2006.01)

(52) U.S. Cl.
CPC ..... *H04N 1/00045* (2013.01); *H04N 1/00018* (2013.01); *H04N 1/00034* (2013.01);
(Continued)

(58) Field of Classification Search
CPC .......... H04N 1/00018; H04N 1/00795; H04N 2201/0081; H04N 1/00411;
(Continued)

(56) References Cited

U.S. PATENT DOCUMENTS 3,653,770 A * 4/1972 Yamamuro .......... G01B 11/046
356/429
5,091,654 A * 2/1992 Coy .................... H04N 1/047
250/559.39
(Continued)

FOREIGN PATENT DOCUMENTS

JP    10-020631    1/1998
JP    2002-199139    7/2002
JP    2011-151548    8/2011

OTHER PUBLICATIONS

Extended European Search Report dated Dec. 6, 2022 issued in corresponding European Appln. No. 22199796.8.

*Primary Examiner* — Negussie Worku
(74) *Attorney, Agent, or Firm* — Harness, Dickey & Pierce, P.L.C.

(57) ABSTRACT

A reading device includes a carriage configured to move in a sub-scanning direction with reference to an object placed on a contact glass, an optical sensor attached to the carriage, the optical sensor being configured to scan the object placed on the contact glass to obtain an image of the object, and a reference scale used as a reference when a dimension of the object is computed based on the image obtained by the optical sensor. In the reading device, the reference scale extends in a main scanning direction and a sub-scanning direction with reference to the object, and is disposed outside a range of image acquisition in which the optical sensor scans the object to obtain the image of the object as the carriage moves and inside a maximum movement range in which the carriage is movable and the optical sensor obtains the image of the object.

20 Claims, 7 Drawing Sheets

(52) U.S. Cl.
CPC ... *H04N 1/1039* (2013.01); *H04N 2201/0081* (2013.01); *H04N 2201/0094* (2013.01)

(58) Field of Classification Search
CPC . H04N 2201/0094; H04N 2201/04734; H04N 1/00002; H04N 1/00031; H04N 1/00037; H04N 1/00039; H04N 1/00045; H04N 1/00053; H04N 1/00063; H04N 1/00068; H04N 1/00681; H04N 1/00702; H04N 1/00708; H04N 1/00737; H04N 1/00761; H04N 1/00774; H04N 1/00779; H04N 1/00785; H04N 1/034; H04N 1/1017; H04N 1/12; H04N 1/193; H04N 1/2307; H04N 1/3878; H04N 2201/04715; H04N 2201/04731; H04N 1/00604; H04N 1/00748; H04N 1/2032; H04N 1/40056; H04N 1/00204; H04N 1/00408; H04N 1/00413; H04N 1/00493; H04N 1/00811; H04N 1/00824; H04N 1/00973; H04N 1/047; H04N 1/1061; H04N 1/506; H04N 2201/0075; H04N 2201/0422; H04N 2201/0446; H04N 2201/0452; H04N 1/053; H04N 1/1008; H04N 1/1135; H04N 1/3935; H04N 1/40062; H04N 1/448; H04N 1/64; H04N 2201/0416; H04N 2201/0418; H04N 2201/0471; H04N 2201/04746; G06T 7/564; G06T 7/001; G06T 2207/10032; G06T 2207/30141; G06T 7/62; G06T 1/0021; G06T 11/008; G06T 2201/0052; G06T 2207/10081; G06T 2207/20064; G06T 2207/20128; G06T 2207/20132; G06T 2207/30016; G06T 5/002; G06T 7/11; G06T 7/12; G06T 7/73; G06T 2207/10004; G06T 2207/10028; G06T 2207/10152; G06T 2207/20021; G06T 2207/20081; G06T 2207/20192; G06T 2207/30164; G06T 2207/30181; G06T 2207/30244; G06T 3/0006; G06T 5/006; G06T 7/0004; G06T 7/136; G06T 7/33; G06T 7/344; G06T 7/75; G06T 7/85; G03G 15/5062; G03G 21/046; G03G 15/00; G03G 15/234; G03G 15/607
USPC .......................................................... 358/497
See application file for complete search history.

(56) References Cited

U.S. PATENT DOCUMENTS

| | | | |
|---|---|---|---|
| 5,450,173 A | 9/1995 | Bekanich | |
| 6,094,269 A * | 7/2000 | Ben-Dove | G01B 11/2522 250/559.22 |
| 8,550,583 B2 * | 10/2013 | Sai | B41J 19/207 347/5 |
| 8,810,873 B2 * | 8/2014 | Hill | H04N 1/1035 358/482 |
| 9,267,819 B2 * | 2/2016 | Cook | G01D 5/2275 |
| 9,372,160 B2 * | 6/2016 | Nygaard | G01N 21/9515 |
| 2005/0146760 A1 | 7/2005 | Kim et al. | |
| 2010/0073694 A1 * | 3/2010 | Fujiwara | H04N 1/40 358/449 |
| 2011/0122455 A1 | 5/2011 | Elliot et al. | |
| 2011/0181920 A1 | 7/2011 | Kim | |
| 2015/0015922 A1 | 1/2015 | Isaev | |
| 2016/0142586 A1 | 5/2016 | Ishida et al. | |
| 2017/0048410 A1 * | 2/2017 | Noro | H04N 1/00748 |
| 2019/0361387 A1 | 11/2019 | Ishida | |
| 2021/0377400 A1 * | 12/2021 | Ishida | H04N 1/00315 |
| 2021/0377418 A1 * | 12/2021 | Ishida | G06F 3/1204 |
| 2022/0122455 A1 * | 4/2022 | Ota | B60W 50/14 |
| 2023/0143978 A1 | 5/2023 | Ishida | H04N 1/00708 358/474 |

* cited by examiner

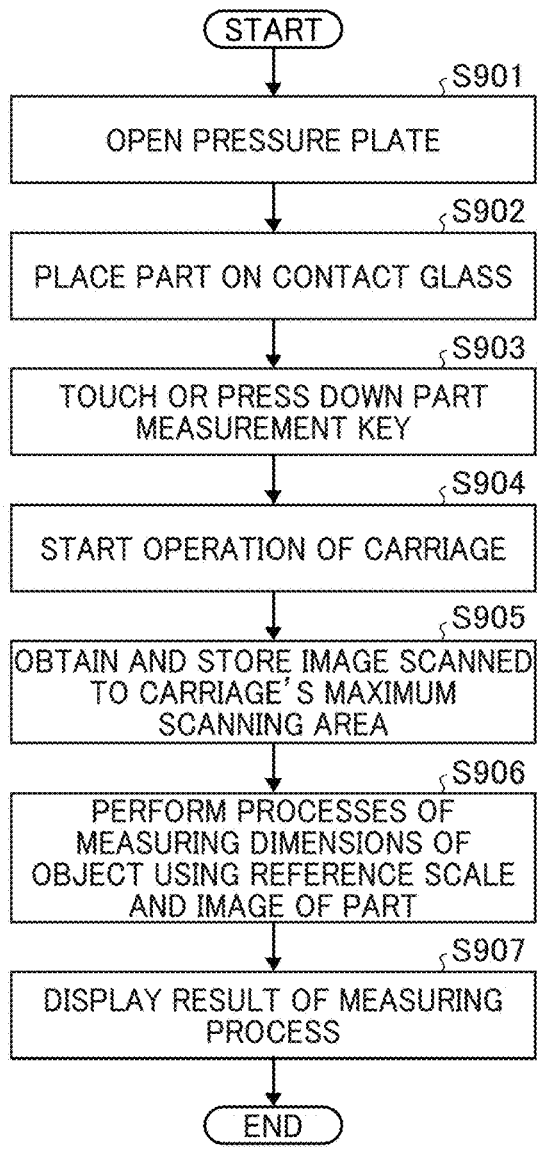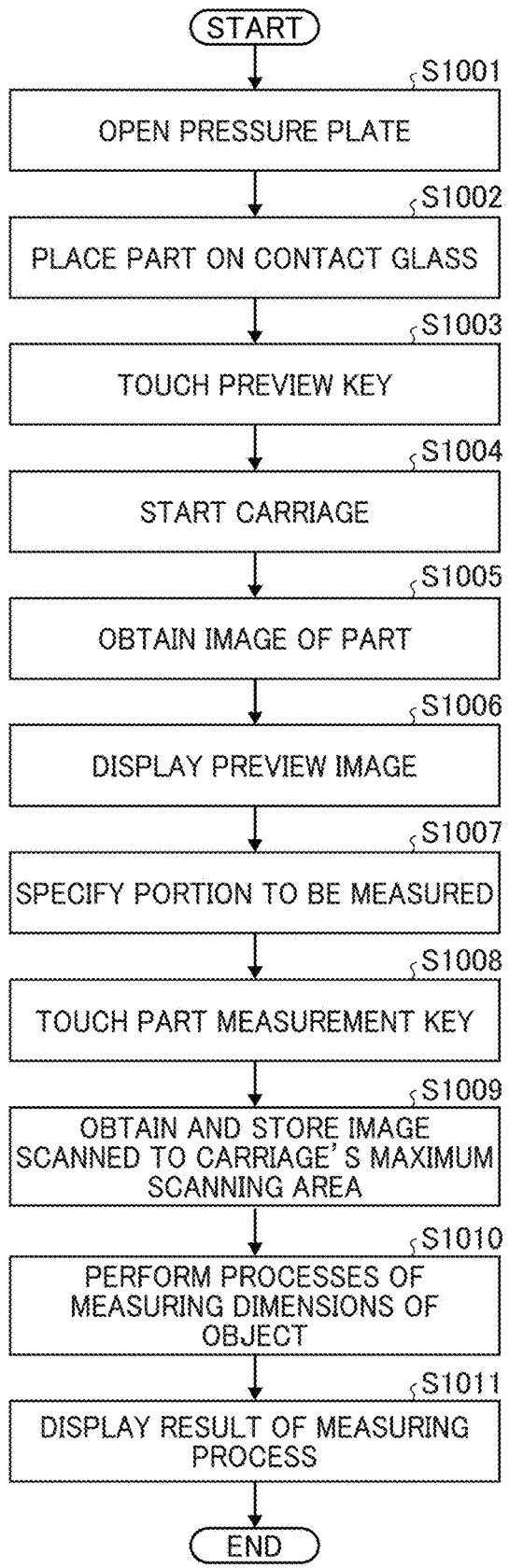

READING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2021-170443, filed on Oct. 18, 2021, the Japan Patent Office, the entire disclosure of which is hereby incorporated by reference herein.

BACKGROUND

Technical Field

Embodiments of the present disclosure relate to a reading device and an image forming apparatus.

BACKGROUND ART

Reading devices that optically scan, for example, the shape of an object are known. In such known reading devices, an object to be scanned is placed on a transparent member such as a member made of glass, and the placed object to be scanned is irradiated with light. Then, the light reflected by the placed object to be scanned is detected, and the data is generated based on, for example, the shape of the object.

In such reading devices known in the art, for example, a reference scale that is made of a hard component and has tick marks at predetermined intervals is placed on the reading face, and an image of the reference scale is scanned and obtained. Moreover, the position of the tick marks on the scanned image is measured, and the relative positions of the elements in the image are specified.

SUMMARY

Embodiments of the present disclosure described herein provide a reading device including a carriage configured to move in a sub-scanning direction with reference to an object placed on a contact glass, an optical sensor attached to the carriage, the optical sensor being configured to scan the object placed on the contact glass to obtain an image of the object, and a reference scale used as a reference when a dimension of the object is computed based on the image obtained by the optical sensor. In the reading device, the reference scale extends in a main scanning direction and a sub-scanning direction with reference to the object, and is disposed outside a range of image acquisition in which the optical sensor scans the object to obtain the image of the object as the carriage moves and inside a maximum movement range in which the carriage is movable and the optical sensor obtains the image of the object.

According to one aspect of the present disclosure, an image of an object to be scanned and an image of a reference scale can be scanned and obtained at the same time, and the precision of the measurement in which the dimensions of the object to be scanned are measured can be enhanced.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 9 is a flowchart of the scanning processes that can be performed by the scanner unit of FIG. 4.

FIG. 10 is a flowchart of the scanning processes that can be performed by the scanner unit of FIG. 4, according to an alternative embodiment of the present embodiment.

Figure 1:
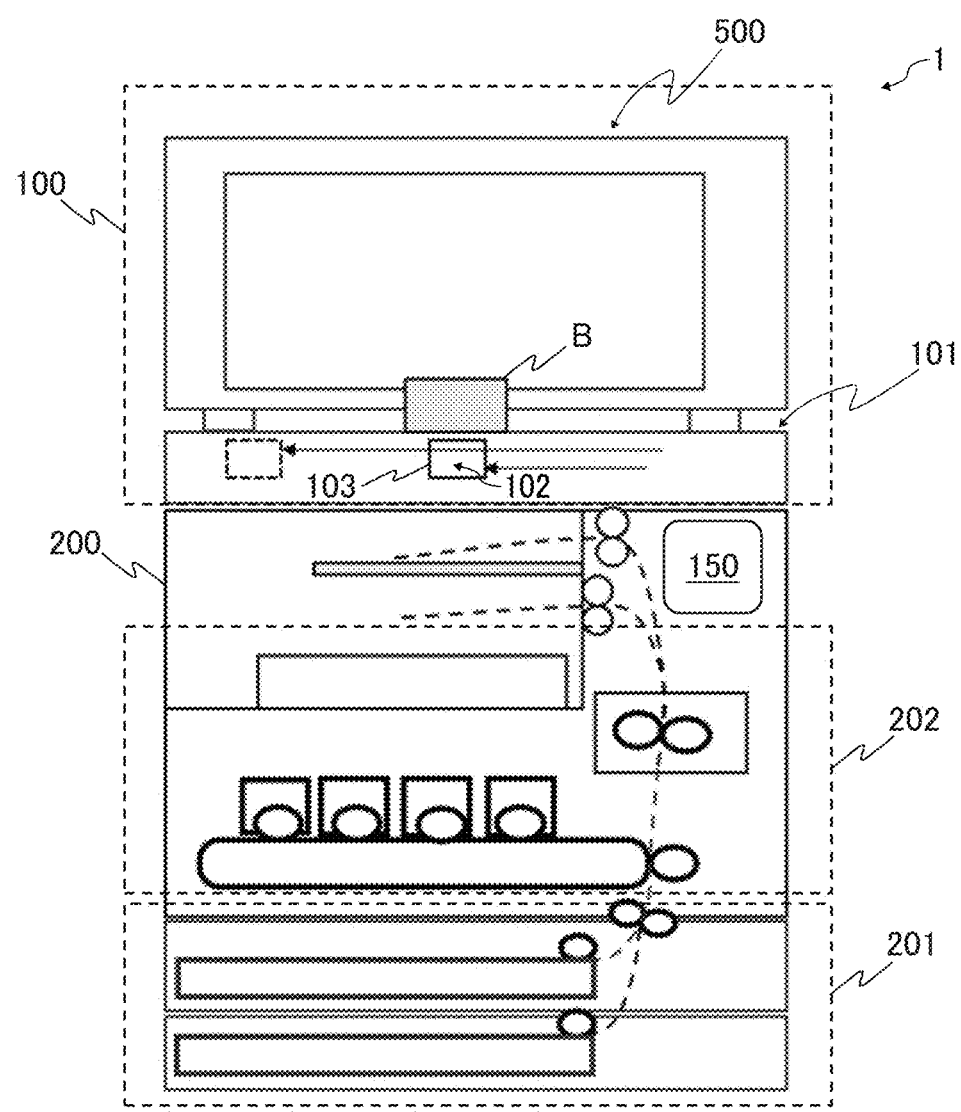
FIG. 1 is a schematic diagram illustrating a configuration of a multifunction peripheral (MFP) that serves as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image forming apparatus and a reading device according to an embodiment of the present disclosure are described below with reference to the drawings.

FIG. 1 is a schematic diagram illustrating a configuration of a multifunction peripheral (MFP) 1 that serves as an image forming apparatus according to an embodiment of the present disclosure.

The MFP 1 is provided with a scanner unit 100 that serves as a reading device according to embodiments of the present disclosure and an image forming unit 200 that forms an image on a sheet-like recording medium.

The scanner unit 100 according to the present embodiment includes a contact glass 101, an optical sensor 102, and a carriage 103. The contact glass 101 according to the present embodiment serves as a mounting table on which an object to be scanned B is to be mounted. The optical sensor 102 is an image sensor that irradiates the object to be scanned B placed on the contact glass 101 with light and obtains an optical image of the object to be scanned B based on the reflected light. The carriage 103 moves in the sub-scanning direction with respect to the object to be scanned B such that the optical sensor 102 can scan the object to be scanned B.

The optical sensor 102 is arranged in a line in the main scanning direction orthogonal to the sub-scanning direction in which the carriage 103 moves. In the scanner unit 100 according to the present embodiment, the optical sensor 102 scans the to-be-scanned object B while moving the scanning line in the sub-scanning direction. By so doing, an image of the entirety of the object to be scanned B can be obtained.

The scanner unit 100 according to the present embodiment is also provided with an automatic document feeder (ADF) 500 that serves as a medium conveyance unit that conveys a recording medium such as a sheet-like object to be scanned B to the contact glass 101.

The image forming unit 200 according to the present embodiment is provided with a medium accommodating unit 201 that stores a sheet P that serves as a sheet-like medium, and an image forming device 202 that forms an image on the sheet P. The image forming device 202 according to the present embodiment can form an image read by the scanner unit 100 on the sheet P.

Figure 2:
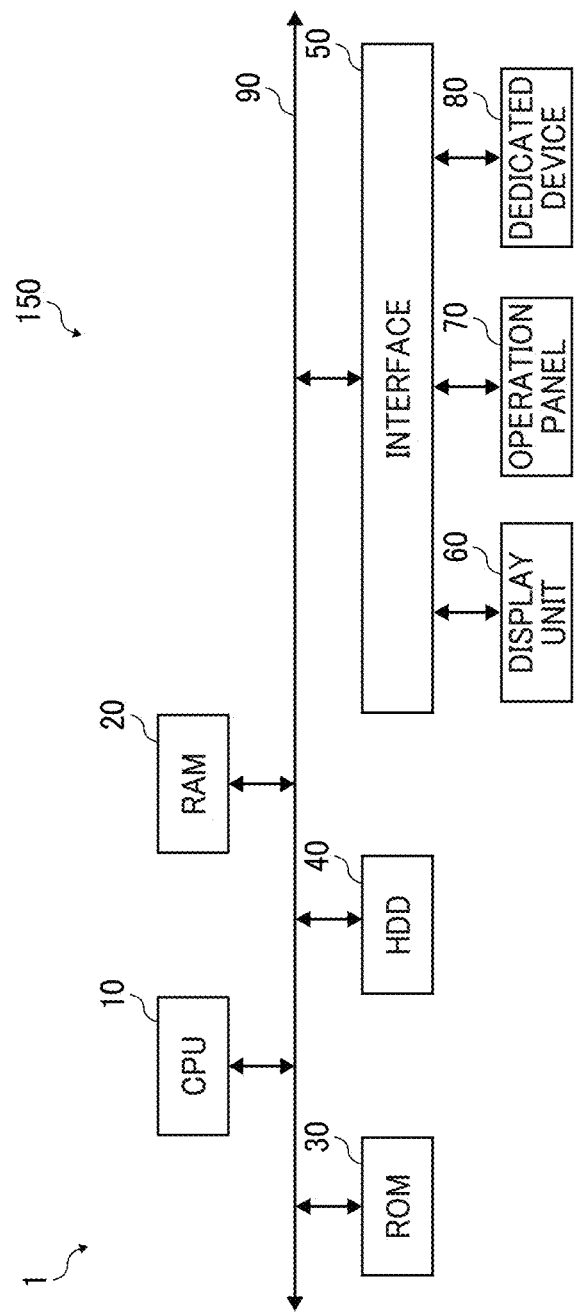
FIG. 2 is a block diagram illustrating a hardware configuration of a controller provided for the MFP of FIG. 1.

FIG. 2 is a diagram illustrating a hardware configuration of the controller 150 provided for the MFP 1 according to the present embodiment.

As illustrated in FIG. 2, the MFP 1 according to the present embodiment has a configuration similar to that of known information processing devices such as personal computers (PCs) and servers. In other words, a central processing unit (CPU) 10, a random access memory (RAM) 20, a read only memory (ROM) 30, a hard disk drive (HDD) 40, and an interface (I/F) 50 are connected to each other through a bus 90 in the MFP 1 according to the present embodiment. The interface 50 is coupled to a display unit 60, an operation panel 70, and a dedicated device 80. The dedicated device 80 includes the scanner unit 100 and the image forming unit 200.

The CPU 10 is a computation unit that controls all operations of the MFP 1. The RAM 20 is a volatile memory where data can be read and written at high speed, and is used as a work area when the CPU 10 processes data. The ROM 30 is a read-only nonvolatile memory in which firmware programs or the like are stored. The HDD 40 is a data readable/writable nonvolatile memory in which, for example, an operating system (OS), various kinds of control programs such as an applied-voltage control program, and an application program are stored.

The interface 50 connects, for example, various kinds of hardware, or networks to the bus 90, and controls these elements. The display unit 60 according to the present embodiment is a user interface that allows a user to visually check the status of the MFP 1, and is implemented by a display device such as a liquid crystal display (LCD).

The operation panel 70 is a user interface through which the data is input to the MFP 1. The dedicated device 80 includes the scanner unit 100 and the image forming unit 200.

In such a hardware configuration, the programs that are stored in the ROM 30 and the HDD 40, or in another recording medium such as an optical disk are read by the RAM 20, and the CPU 10 performs computation based on these programs loaded into the RAM 20. This series of processes configures a software controller. The software controller as configured above and hardware are combined to configure a functional block that implements the functions of the MFP 1 according to the present embodiment.

A functional configuration of the MFP 1 according to the present embodiment is described below with reference to FIG. 3.

Figure 3:
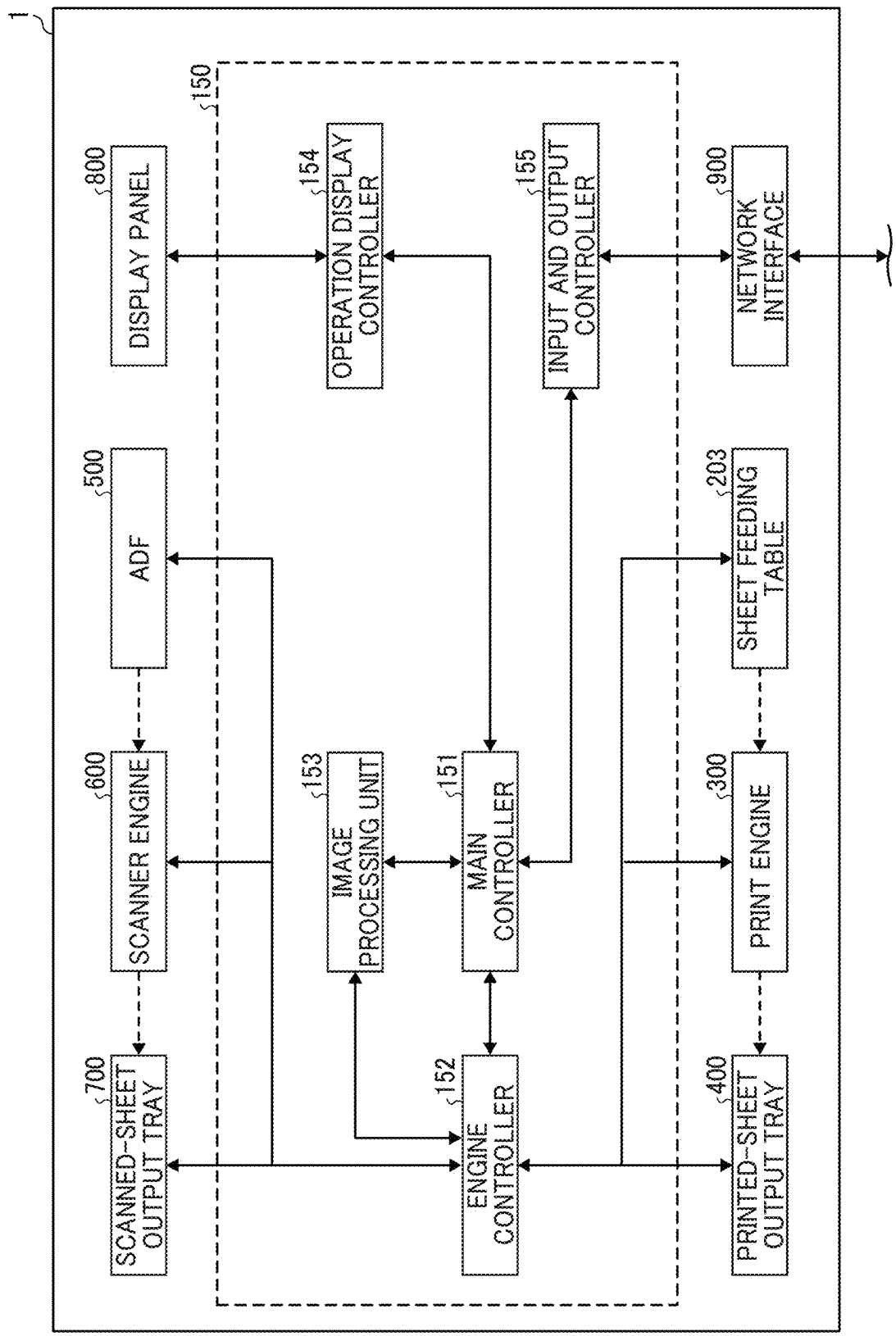
FIG. 3 is a schematic block diagram illustrating a functional configuration of the MFP 1 of FIG. 1.

FIG. 3 is a schematic block diagram illustrating a functional configuration of the multifunction peripheral (MFP) 1 according to the present embodiment.

In FIG. 3, electrical connections are indicated by solid-line arrows, and the flow of transfer sheets or a bundle of documents is indicated by arrows with broken lines.

As illustrated in FIG. 3, the MFP 1 according to the present embodiment includes a controller 150, a sheet feeding table 203, a print engine 300, a printed-sheet output tray 400, an automatic document feeder (ADF) 500, a scanner engine 600, a scanned-sheet output tray 700, a display panel 800, and a network interface (I/F) 900. The controller 150 according to the present embodiment includes a main controller 151, an engine controller 152, an image processing unit 153, an operation display controller 154, and an input and output controller 155.

The sheet feeding table 203 according to the present embodiment feeds a transfer sheet to the print engine 300 that serves as an image forming device. The print engine 300 serves as an image forming device that draws an image by forming and outputting an image on the transfer sheet conveyed from the sheet feeding table 203. The print engine 300 according to the present embodiment may be an image formation mechanism using an electrophotographic method. The transfer sheet on which an image has been formed by the print engine 300 is ejected to the printed-sheet output tray 400. The print engine 300 according to the present embodiment is implemented by the dedicated device 80 as illustrated in FIG. 1.

The ADF 500 automatically conveys the object to be scanned B to a position where the object to be scanned B can be scanned by the scanner engine 600 that executes some of the processes in the scanner unit 100. The scanner engine 600 according to the present embodiment is a document reading device including a photoelectric conversion element that converts the optical information into an electrical signal, and generates image data by optically scanning and reading the document automatically conveyed by the ADF 500 or the document placed on a document-stage glass. The document that is automatically conveyed by the ADF 500 and scanned by the scanner engine 600 is ejected to the scanned-sheet output tray 700. The ADF 500 and the scanner engine 600 according to the present embodiment are implemented by the dedicated devices 80 as illustrated in FIG. 1.

The display panel 800 is an output interface on which the status of the MFP 1 is visually displayed, and also is an input interface such as a touch panel through which the MFP 1 is directly operated and the data is input to the MFP 1. Moreover, the display panel 800 has a function to display an image through which the operation made by a user is received and accepted. The display panel 800 is implemented by the display unit 60 and the operation panel 70 as illustrated in FIG. 1.

The network interface 900 according to the present embodiment is an interface through which the MFP 1 communicates with other devices such as administrator terminals and personal computers (PCs) through the network, and interfaces such as Ethernet (registered trademark), universal serial bus (USB) interfaces, Bluetooth (registered trademark), wireless fidelity (Wi-Fi) (registered trademark), and FeliCa (registered trademark) are used. As described above, the MFP 1 according to the present embodiment receives the image data to be printed and various kinds of control commands such as a printing request from the terminals connected through the network interface 900. The network interface 900 is implemented by the interface 50 as illustrated in FIG. 1.

The controller 150 is configured by a combination of software and hardware. More specifically, the controller 150 is configured by the combination of hardware such as an integrated circuit and a software controller that is implemented as control programs such as the firmware stored in a nonvolatile memory such as the ROM 30 or the HDD 40 are loaded into the RAM 20 and the CPU 10 performs computation based on these loaded programs. The controller 150 serves as a controller that controls the entirety of the MFP 1. Accordingly, in the present embodiment, the controller 150 serves as an applied-voltage control device.

The main controller 151 plays a role in controlling the multiple elements provided for the controller 150, and gives a command to each element of the controller 150. Moreover, the main controller 151 controls the input and output controller 155, and accesses other devices through the network interface 900 and the network. The engine controller 152 controls or drives a driver such as the print engine 300 and the scanner engine 600.

The image processing unit 153 according to the present embodiment is controlled by the main controller 151, and generates drawing information as output data based on the image data written in, for example, the page-description language (PDL). Such image data may be, for example, the documental data or image data included in the input print job. The drawing information is information such as cyan, magenta, yellow, and black (CMYK) bitmap data, and is used to draw an image to be formed when the print engine 300 that serves as an image forming device performs image-forming operation.

Further, the image processing unit 153 processes the data of imaging input from the scanner engine 600 to generate the image data. The generated image data is stored in the MFP 1 as the data obtained as a result of the scanning processes, or is sent to other devices through the network interface 900 or the network. Note that the MFP 1 according to the present embodiment can directly receive the drawing information instead of the image data and can form and output an image based on the directly-input drawing information.

The operation display controller 154 displays information on the display panel 800, or notifies the main controller 151 of the data input through the display panel 800. The input and output controller 155 inputs the signals and commands input through the network interface 900 and the network to the main controller 151.

A detailed configuration of the scanner unit 100 is described below.

Figure 4:
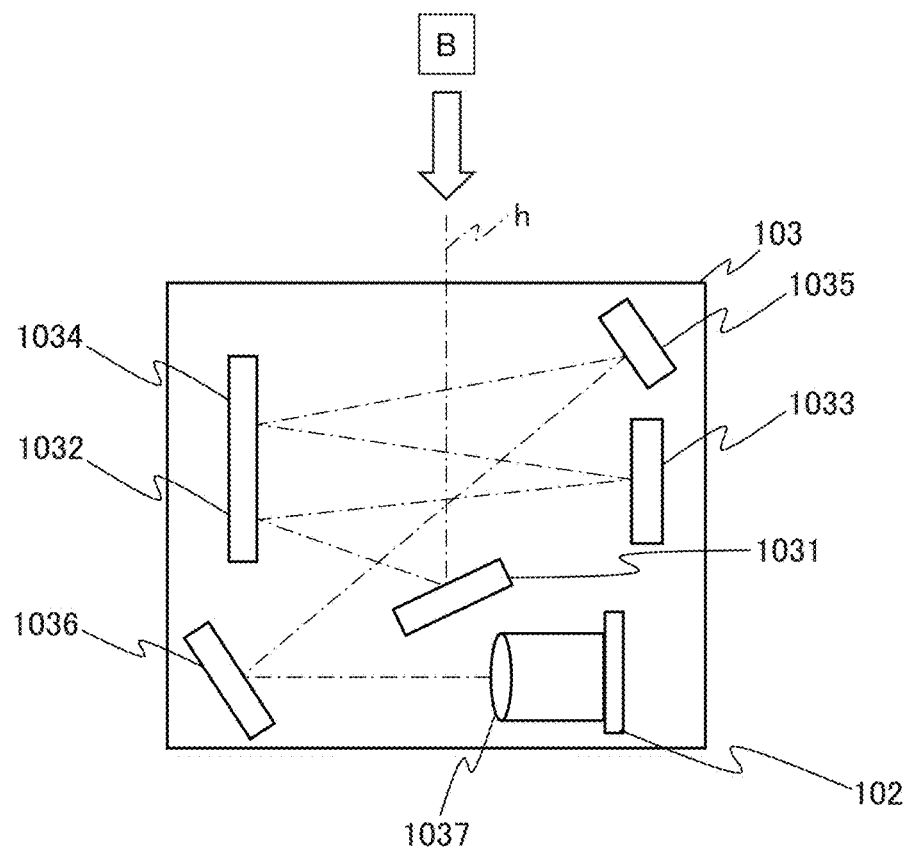
FIG. 4 is a schematic diagram of an optical system of a scanner unit that serves as a reading device according to an embodiment of the present disclosure.

FIG. 4 is a diagram illustrating an outline of an optical system mounted on the carriage 103, according to the present embodiment.

As illustrated in FIG. 4, the light that is emitted from the light source provided for the carriage 103 is reflected by the object to be scanned B, and the reflected light enters the reduction optical system along an optical path h. Then, the reflected light is reflected by a first mirror 1031.

The light that is reflected by a first mirror 1031 is reflected by a second mirror 1032, a third mirror 1033, a fourth mirror 1034, a fifth mirror 1035, and a sixth mirror 1036 in the order listed, and passes through a lens 1037. Finally, the light is incident on the optical sensor 102. The optical sensor 102 according to the present embodiment is, for example, a charge coupled device (CCD) sensor.

The image of the object to be scanned B is converted into an electrical signal based on the light detected by the optical sensor 102, and the controller 150 performs predetermined processing on the obtained electrical signal. As a result, the image data of the object to be scanned B is generated.

Figure 5:
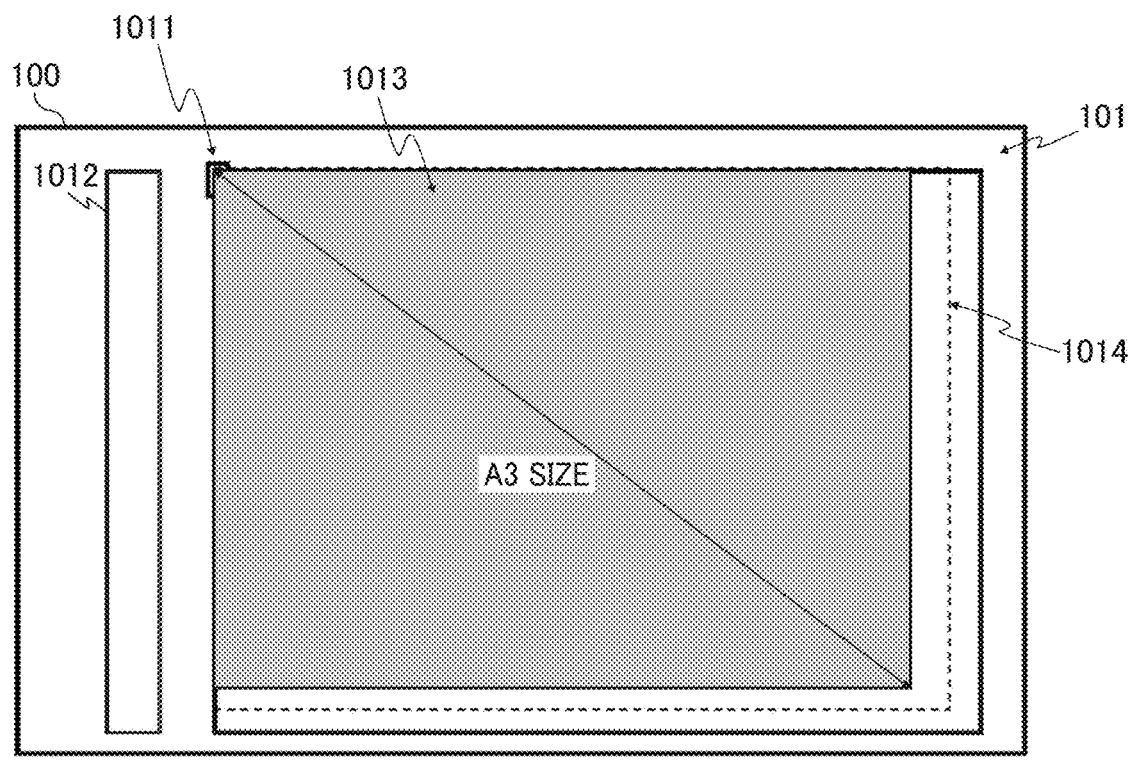
FIG. 5 is a plan view of the scanner unit of FIG. 4.

FIG. 5 is a plan view of the scanner unit 100 according to the present embodiment in which the contact glass 101 is viewed from the mounting table on which the object to be scanned B is placed.

The rear side of the contact glass 101 as illustrated in FIG. 5 serves as the reading face of the contact glass 101. The rear side of the contact glass 101 corresponds to a side of the sheet in the depth direction.

As illustrated in FIG. 5, in the scanner unit 100 according to the present embodiment, a document-size reference line 1011 is indicated that serves as a reference position when the flat sheet-like object to be scanned B is placed on the mounting table of the contact glass 101. In FIG. 5, the scanner unit 100 is in a standby mode before the scanning operation is to be started. Accordingly, the carriage 103 is waiting at the carriage home position 1012. The carriage home position 1012 corresponds to a standby position before the carriage 103 starts the scanning operation.

The scanner unit 100 according to the present embodiment has a planar-medium's maximum scanning area 1013 that indicates the maximum range of image acquisition in which the object to be scanned B is scanned to obtain an image and a carriage's maximum scanning area 1014 that indicates the maximum range of movement in which the carriage 103 moves and the optical sensor 102 can perform scanning, and these areas of the scanner unit 100 are set in advance. In other words, the carriage's maximum scanning area 1014 is equivalent to the area that is surrounded by a pair of edges of the maximum range in which the carriage 103 moves for scanning at furthest and a pair of edges of the carriage home position 1012 on the other side.

In FIG. 5, the planar-medium's maximum scanning area 1013 when the object to be scanned B is a sheet P of A3 size is indicated by a shaded area.

Figure 6:
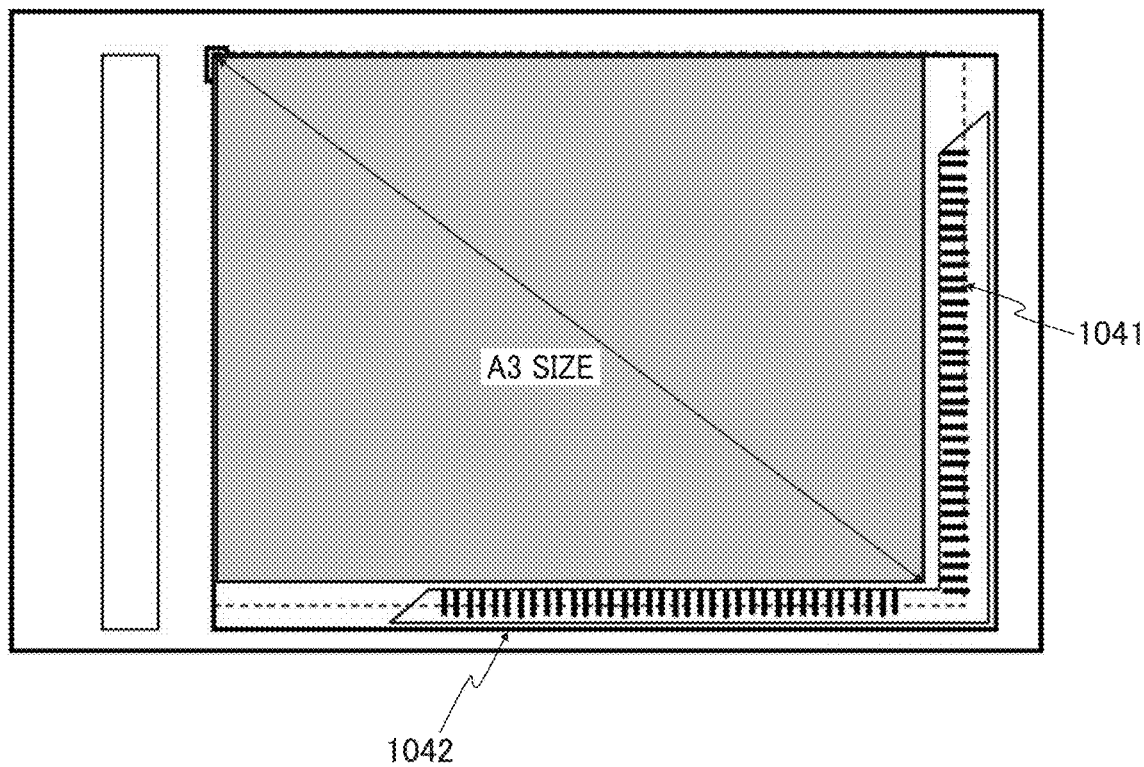
FIG. 6 is a diagram illustrating an arrangement of a reference scale provided for the scanner unit of FIG. 4.

FIG. 6 is a diagram illustrating an arrangement of the reference scale 104 provided for the scanner unit 100 according to the present embodiment.

As illustrated in FIG. 6, the reference scale 104 includes a main scanning direction scale 1041 and a sub-scanning direction scale 1042.

Both the main scanning direction scale 1041 and the sub-scanning direction scale 1042 are arranged at positions corresponding to the outside of the planar-medium's maximum scanning area 1013 and the inside of the carriage's maximum scanning area 1014. As illustrated in FIG. 6, the reference scale 104 has ticks on the reading face on the contact glass 101, and such ticks of the scale serve as a reference when the dimensions of an object are measured.

As illustrated in FIG. 6, the main scanning direction scale 1041 extends in the main scanning direction, and is arranged outside the edge of the maximum-size document readable on the contact glass 101 in the sub-scanning direction. As illustrated in FIG. 6, the sub-scanning direction scale 1042 extends in the sub-scanning direction, and is arranged outside the edge of the maximum-size document readable on the contact glass 101 in the main scanning direction.

The reference scale 104 according to the present embodiment may be disposed below the contact glass 101 around the carriage 103, or may be disposed above the contact glass 101 where the object to be scanned B is placed.

The degree of precision in the correction of the scanning by the optical sensor 102 is enhanced when the reference scale 104 is arranged on the mounting table of the object to be scanned B on the top face. As the reference scale 104 is used for correction of the optical sensor 102, ticks are to be arranged on its downside so as to face the carriage 103. In other words, the reference scale 104 may be arranged on both sides of the contact glass 101. If the reference scale 104 is arranged on both sides of the contact glass 101, the position of the reference scale 104 becomes visually recognizable, and the optical sensor 102 that faces the lower surface of the contact glass 101 in an upward direction can obtain the images of the reference scale 104 and the object to be scanned B at the same time.

Regarding the face of the reference scale 104 that is arranged to face the carriage 103, it is desired that the color indicating the ticks of the scale be different from the color of the base part on which the ticks of the scale are formed so as not to reflect the light emitted from the light source provided for the carriage 103. For example, the color of the lines indicating the ticks of the scale is made white using, for example, steel use stainless (SUS) polishing, and the degree of contrast of the lines on the image can be increased for increased visual recognizability.

Alternatively, steel use stainless (SUS) may be used as the material for the reference scale 104, and the ticks of the scale may be formed in black. Such a configuration does not affect the processes of simultaneously obtaining an image and the object to be scanned B.

Figure 7:
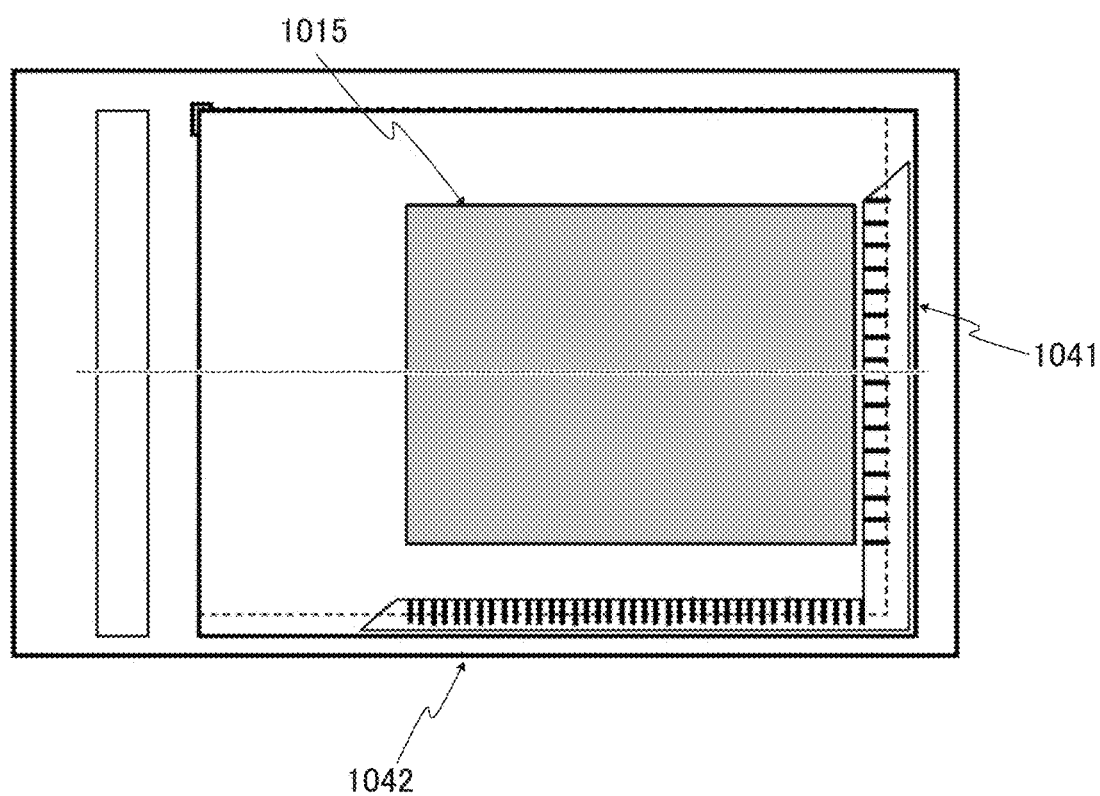
FIG. 7 is a diagram illustrating a scanning range in the scanner unit of FIG. 4 when an object to be scanned is a three-dimensional object.

FIG. 7 is a diagram illustrating a scanning range when the object to be scanned B is a three-dimensional object, according to the present embodiment.

As illustrated in FIG. 7, a part measurement range 1015 is arranged at a position different from the planar-medium's maximum scanning area 1013 that is the scanning range when the object to be scanned B is a planar object. A portion of the part measurement range 1015 in the sub-scanning direction around the turning point in the movement of the carriage 103 serves as a reference position for placement. As the range in the main scanning direction is set so as to be distributed with respect to the center of the optical path, the center point in the main scanning direction serves as a reference position for placement.

Regarding the moving direction of the carriage 103 in the sub-scanning direction and the optical direction in which the optical sensor 102 mounted on the carriage 103 optically scans the object to be scanned B in the main scanning direction, the positional displacement of the moving direction of the carriage 103 tends to be greater than the optical direction. In order to handle such a situation, the intervals at which the ticks of the sub-scanning direction scale 1042 are made narrower than the intervals at which the ticks of the main scanning direction scale 1041 to further enhance the precision of the measurement. In other words, in the reference scale 104, the sub-scanning direction scale 1042 is a finer scale than the main scanning direction scale 1041.

The operation of the scanner unit 100 according to the present embodiment is described below with reference to FIG. 8A and FIG. 8B.

Figure 8A:
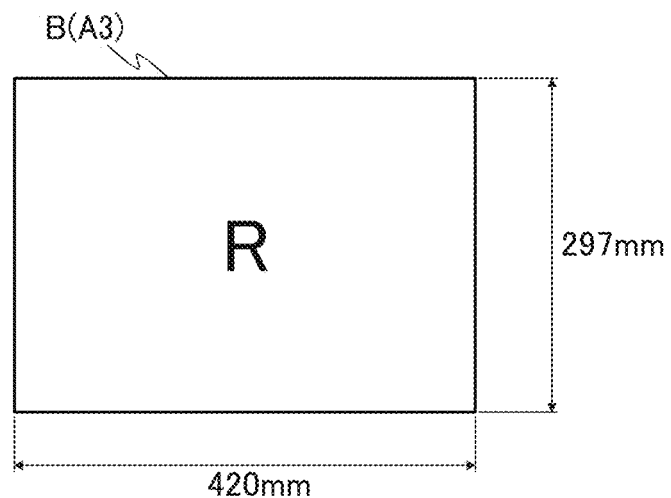
FIG. 8A and FIG. 8B are diagrams each illustrating the operation of the scanner unit of FIG. 4.
Figure 8B:
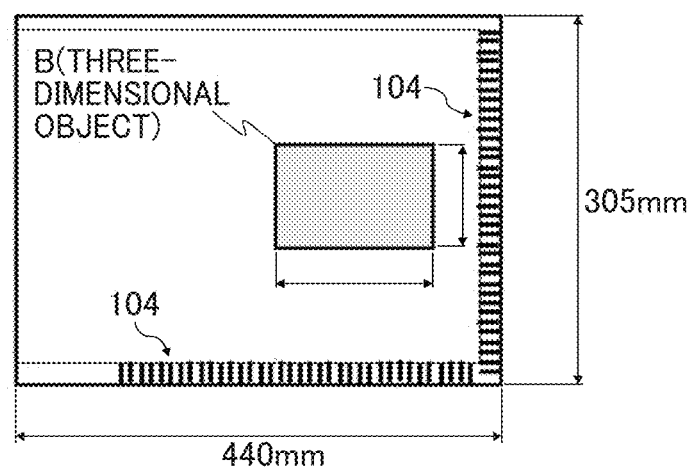

FIG. 8A illustrates an image obtained by performing the scanning processes on the object to be scanned B when the object to be scanned B is a planar object and is a sheet P of A3 size.

In this case, an image is obtained in a range of 420 mm×297 mm.

In the present embodiment described with reference to FIG. 8B, the object to be scanned B is a three-dimensional object and scanning is performed to a movable range of the carriage 103 to obtain an image of the object.

In this case, for example, an image of the object to be scanned B and an image of the reference scale 104 are simultaneously obtained from a range of 440 mm×305 mm.

Then, the image portion of the reference scale 104 is compared with the image portion of the object to be scanned B included in the obtained image, and the dimensions of the object to be measured are measured.

FIG. 9 is a flowchart of the scanning processes that can be performed by the scanner unit 100, according to the present embodiment.

More specifically, the processes in the flowchart in FIG. 9 are to be performed when the object to be scanned B is a three-dimensional object.

Firstly, in a step S901, a pressure plate is opened to place the object to be scanned B on the mounting table of the contact glass 101. The pressure plate according to the present embodiment in the configuration or structure that includes the ADF 500 is a plate-like component that covers the contact glass 101 to hold a planar object placed on the contact glass 101.

Subsequently, in a step S902, the object to be scanned B is placed on the mounting table of the contact glass 101.

Subsequently, in a step S903, a part measurement key that is arranged on the operation panel 70 is touched or pressed down to start the scanning process. Once the scanning process starts, firstly, in a step S904, the carriage 103 starts operating, and the optical sensor 102 starts scanning the object to be scanned B as the carriage 103 moves.

An image of the object to be scanned B and an image of the reference scale 104 are simultaneously obtained as the object to be measured is scanned while the carriage 103 is being moved to the carriage's maximum scanning area 1014. In a step S905, the obtained image is stored in the storage area.

Subsequently, a portion of the obtained image including the image of the reference scale 104 is specified, and a portion of the obtained image including the image of the object to be scanned B is specified. In a step S906, the dimensions of the object to be scanned B are measured by comparing these specified images with each other.

Finally, in a step S907, the result of the measuring process is displayed on the display unit 60, and the scanning processes of a three-dimensional object are terminated.

FIG. 10 is a flowchart of the scanning processes that can be performed by the scanner unit 100, according to an alternative embodiment of the present embodiment.

The flowchart in FIG. 10 illustrates the processes to be performed when the object to be scanned B is a three-dimensional object and a desired portion to be measured is specified.

In a similar manner to the first case of the present disclosure as described above, firstly, in a step S1001, the pressure plate is opened to place the object to be scanned B on the mounting table of the contact glass 101, and then, in a step S1002, the object to be scanned B is placed on the mounting table of the contact glass 101. Subsequently, in a step S1003, a preview key that is arranged on the operation panel 70 is touched or pressed down to start a preview process.

In the preview process, only the image of the object to be scanned B is obtained, and the obtained image is displayed on the display unit 60 as a preview. In other words, firstly, in a step S1004, the carriage 103 is operated, and scans the object to be scanned B using the optical sensor 102 as the carriage 103 moves. In a step S1005, the object to be measured is scanned in the part measurement range 1015 in which the object to be scanned B is to be scanned while moving the carriage 103, and the image of the object to be scanned B is obtained at the same time. Then, the obtained image of the object to be scanned B is stored in the storage area.

In a step S1006, the display unit 60 is controlled to display the image stored in the storage area as a preview image. Then, in a step S1007, the portion to be measured on the image displayed on the display unit 60 is specified through the operation panel 70. After the portion to be measured is specified, in a step S1008, the part measurement key that is arranged on the operation panel 70 is touched or pressed down to start the scanning process.

Once the scanning process starts, the object to be scanned B is scanned using the optical sensor 102 as the carriage 103 moves, and such scanning of the object to be scanned B is carried out while the carriage 103 is being moved to the carriage's maximum scanning area 1014. As a result, the image of the reference scale 104 and the image of the object to be scanned B within range of the specified portion to be measured can be obtained at the same time. In a step S1009, the obtained images are stored in the storage area.

Subsequently, a portion of the obtained image including the image of the reference scale 104 is specified, and a portion of the obtained image including the portion specified as the object to be measured is specified out of the portion of the obtained image including the image of the object to be scanned B. Then, such a pair of specified images are compared with each other. By so doing, in a step S1010, the object to be scanned B can be measured.

Finally, in a step S1011, the result of the measuring process is displayed on the display unit 60, and the scanning processes of a three-dimensional object are terminated.

The processes that are described with reference to FIG. 9 and FIG. 10 are implemented by the computation executable in the main controller 151 and the image processing unit 153. In the above-described process, the image processing unit 153 performs the processes of determining the image portions of the object to be scanned B and the reference scale 104 on the scanned image obtained by simultaneously obtaining the images of the object to be scanned B and the reference scale 104. The results of the above processes are passed to the main controller 151, and the data to be used for computing the dimensions of the object to be scanned B becomes available. Accordingly, the main controller 151 performs the computation of the dimensions.

In other words, in the present embodiment, the dimension computation unit is implemented by the functional blocks that include the main controller 151 and the image processing unit 153.

As described above, the scanner unit 100 according to the present embodiment is provided with the carriage 103 under the contact glass 101, and an image of the object to be scanned B and an image of the reference scale 104, which is permanently-installed, can be simultaneously obtained using the optical sensor 102 provided for the carriage 103. The reference scale 104 is arranged so as to enable such simultaneous acquisition, and the range in which components are measured when the object to be scanned is a three-dimensional object is made different from the area to be scanned when the planar object is an object to be scanned.

For example, it is assumed in design that the maximum length with which the object to be scanned B can be scanned in the main scanning direction is 297 millimeters (mm) and the maximum length with which the object to be scanned B can be scanned in the sub-scanning direction is 420 mm. Moreover, it is assumed in design that the maximum range in which the carriage 103 can move and scanning can be performed by the optical sensor 102 in the main scanning direction is 306 mm and the maximum range in which scanning can be performed by the optical sensor 102 in the sub-scanning direction is 435 mm. The reference scale 104 is arranged in each of the main scanning direction and the sub-scanning direction within the maximum range in which scanning can be performed and outside the maximum length with which the object to be scanned B can be scanned.

Due to such configurations as described above, an image of the reference scale 104 and an image of the object to be scanned B can be obtained at the same time, and the degree of precision of the measurement significantly increases.

As the reference scale 104 can be permanently installed in the scanner unit 100, the operability of the scanning processes when the object to be scanned B is a planar object can be enhanced, and the operability of the scanning processes when the object to be scanned B is a three-dimensional object can be enhanced.

In order to obtain an image appropriately in each case in which the object to be scanned B is planar or the object to be scanned B is a three-dimensional object, the scanning range of the optical sensor 102 is set to various ranges.

For example, when the object to be scanned B is a planar object, the base in the depth direction is the base of the scanning range in the main scanning direction, and the base of the scanning range in the sub-scanning direction is the carriage home position 1012. When the object to be scanned B is a three-dimensional object, the main base is the base of the scanning range in the main scanning direction, and the base of the scanning range in the sub-scanning direction is close to the turning point of the carriage 103.

Due to such a configuration and setting as described above, the degree of precision increases in the main scanning direction in a reduction optical system. As the scanning range where the base is the center of the optical path is adopted, the degree of precision increases. As the influence of the inconsistencies in speed due to the movement of the carriage 103 in the sub-scanning direction can be reduced, the degree of precision in scanning a three-dimensional object can be increased.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), fieldprogrammable gate array (FPGA), and conventional circuit components arranged to perform the recited functions.

What is claimed is:

1. A reading device comprising:
a carriage configured to move in a sub-scanning direction with reference to an object placed on a contact glass;
an optical sensor attached to the carriage, the optical sensor configured to scan the object placed on the contact glass; and
a reference scale for computing a dimension of the object, the reference scale including a first reference scale extending in a main scanning direction and a second reference scale extending in a sub-scanning direction with reference to the object, the reference scale being outside a range of image acquisition in which the optical sensor scans the object as the carriage moves and inside a maximum movement range in which the carriage is movable and the optical sensor scans the object.

2. The reading device according to claim 1, further comprising
a controller configured to
compute the dimension of the object based on the image obtained by the optical sensor, and
compute a size of the object based on an image of the object obtained via the optical sensor, a first portion of the image obtained by the optical sensor including an image of the reference scale disposed in the main scanning direction, and a second portion of the image obtained by the optical sensor including an image of the reference scale disposed in the sub-scanning direction.

3. The reading device according to claim 1,
wherein, when the object is a planar object, the range of image acquisition is an area between a standby position before the carriage starts scanning and a position of an edge on the contact glass in the main scanning direction.

4. The reading device according to claim 1,
wherein, when the object is a three-dimensional object, a reference position for placement of the three-dimensional object on the contact glass is adjacent to a turning point of the carriage in the sub-scanning direction and is in a center in the main scanning direction.

5. The reading device according to claim 1,
wherein the first reference scale includes a first plurality of tick marks with different intervals from intervals of a second plurality of tick marks of the second reference scale.

6. The reading device according to claim 5,
wherein the intervals of the second plurality of tick marks are narrower than the intervals of first plurality of tick marks.

7. The reading device according to claim 1,
wherein the carriage is configured to carry a reduction optical system including the optical sensor.

8. The reading device of claim 1, wherein the reference scale includes a plurality of tick marks, the plurality of tick marks being a different color from a base part on which the plurality of tick marks are formed.

9. The reading device of claim 8, wherein the plurality of tick marks are white.

10. The reading device of claim 8, wherein the plurality of tick marks are black.

11. The reading device of claim 8, wherein the plurality of tick marks are steel use stainless (SUS).

12. The reading device of claim 1, further comprising a controller configured to compute a dimension of a portion of the object in response to an input indicating the portion of the object.

13. The reading device of claim 1, wherein the carriage is configured to move to the maximum movement range such that the optical sensor scans both of the object and the reference scale at a same time.

14. An image forming apparatus comprising:
a conveyor configured to convey a sheet of recording medium to a contact glass;
a reading device including
a carriage configured to move in a sub-scanning direction with reference to an object placed on a contact glass,
an optical sensor attached to the carriage, the optical sensor configured to scan the object placed on the contact glass, and
a reference scale for computing a dimension of the object, the reference scale including a first reference scale extending in a main scanning direction and a second reference scale extending in a sub-scanning direction with reference to the object, the reference scale being outside a range of image acquisition in which the optical sensor scans the object as the carriage moves and inside a maximum movement range in which the carriage is movable and the optical sensor obtains the image of the object; and
an image forming device configured to form the image of the object obtained by the optical sensor of the reading device on the sheet of recording medium.

15. The image forming apparatus of claim 14, wherein the reference scale includes a plurality of tick marks, the plurality of tick marks being a different color from a base part on which the plurality of tick marks are formed.

16. The image forming apparatus of claim 15, wherein the plurality of tick marks are white.

17. The image forming apparatus of claim 15, wherein the plurality of tick marks are black.

18. The image forming apparatus of claim 15, wherein the plurality of tick marks are steel use stainless (SUS).

19. The image forming apparatus of claim 14, further comprising a controller configured to compute a dimension of a portion of the object in response to an input indicating the portion of the object.

20. The image forming apparatus of claim 14, wherein the carriage is configured to move to the maximum movement range such that the optical sensor scans both of the object and the reference scale at a same time.

* * * * *